US010284096B2

(12) United States Patent
Gritti (10) Patent No.: US 10,284,096 B2
(45) Date of Patent: *May 7, 2019

(54) CURRENT CONVERTER WITH CONTROL ON THE PRIMARY WINDING SIDE AND COMPENSATION OF THE PROPAGATION DELAY

(71) Applicant: STMicroelectronics S.r.l., Agrate Brianza (IT)

(72) Inventor: Giovanni Gritti, Bergamo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/914,501

(22) Filed: Mar. 7, 2018

(65) Prior Publication Data

US 2018/0198371 A1 Jul. 12, 2018

Related U.S. Application Data

(63) Continuation of application No. 14/949,531, filed on Nov. 23, 2015, now Pat. No. 9,954,445.

(30) Foreign Application Priority Data

May 13, 2015 (IT) .................. 102015000014963

(51) Int. Cl.
*H02M 1/42* (2007.01)
*H02M 1/00* (2006.01)
*H02M 3/335* (2006.01)

(52) U.S. Cl.
CPC ... *H02M 3/33507* (2013.01); *H02M 3/33523* (2013.01); *H02M 2001/0009* (2013.01);
(Continued)

(58) Field of Classification Search
CPC ....... H02M 1/4258; H02M 2001/0009; H02M 2001/0016; H02M 2001/0022;
(Continued)

(56) References Cited

U.S. PATENT DOCUMENTS 5,285,366 A 2/1994 Zaretsky
6,333,624 B1 12/2001 Ball et al.
(Continued)

FOREIGN PATENT DOCUMENTS

CN 103066566 A 4/2013
EP 1 744 441 A2 1/2007

OTHER PUBLICATIONS

"FL7733 Primary-Side-Regulated LED Driver with Power Factor Correction," Product Specification, Fairchild Semiconductor Corporation, 2014, 14 pages.
(Continued)

*Primary Examiner* — Timothy J. Dole
*Assistant Examiner* — Sisay G Tiku
(74) *Attorney, Agent, or Firm* — Seed IP Law Group LLP (57) ABSTRACT

A control circuit controls a switch of a switching current converter receiving an input quantity, with a transformer having a primary winding and a sensor element generating a sensing signal correlated to a current in the primary winding. The control circuit has a comparator stage configured to compare a reference signal with a comparison signal correlated to the sensing signal and generate an opening signal for the switch. The comparator stage has a comparator element and a delay-compensation circuit. The delay-compensation circuit is configured to generate a compensation signal correlated to the input quantity and to a propagation delay with respect to the opening signal. The comparator
(Continued)

element generates the opening signal with an advanced timing correlated to the input quantity and to the propagation delay.

20 Claims, 8 Drawing Sheets (52) U.S. Cl.
    CPC ............... *H02M 2001/0016* (2013.01); *H02M 2001/0022* (2013.01)

(58) Field of Classification Search
    CPC ..... H02M 2001/0038; H02M 3/33507; H02M 3/33523
    See application file for complete search history.

(56) References Cited

U.S. PATENT DOCUMENTS

| | | | |
|---|---|---|---|
| 6,642,752 B1 | 11/2003 | Nagaraj | |
| 6,994,034 B2 | 2/2006 | Chang | |
| 7,835,162 B2 | 11/2010 | Lin et al. | |
| 8,300,431 B2 | 10/2012 | Ng et al. | |
| 8,537,574 B2 | 9/2013 | Isogai et al. | |
| 9,263,954 B2 | 2/2016 | Strijker | |
| 9,548,652 B2 | 1/2017 | Cao et al. | |
| 9,647,448 B2 | 5/2017 | Fang et al. | |
| 2007/0041228 A1* | 2/2007 | Fang | H02M 1/32 363/50 |
| 2008/0259654 A1 | 10/2008 | Huynh et al. | |
| 2008/0259656 A1 | 10/2008 | Grant | |
| 2008/0278973 A1 | 11/2008 | Lin et al. | |
| 2008/0291701 A1 | 11/2008 | Lin | |
| 2008/0297963 A1 | 12/2008 | Lee et al. | |
| 2009/0073725 A1 | 3/2009 | Lin | |
| 2010/0124080 A1* | 5/2010 | Yeh | H02M 3/33507 363/21.12 |
| 2010/0321956 A1* | 12/2010 | Yeh | H02M 3/33507 363/16 |
| 2011/0110124 A1 | 5/2011 | Basso et al. | |
| 2012/0026765 A1 | 2/2012 | Adragna | |
| 2012/0250367 A1 | 10/2012 | Desimone et al. | |
| 2012/0281438 A1* | 11/2012 | Fang | H02M 3/33507 363/21.12 |
| 2013/0088897 A1 | 4/2013 | Adragna | |
| 2013/0135775 A1 | 5/2013 | Yao et al. | |
| 2014/0103861 A1 | 4/2014 | Carletti et al. | |
| 2014/0293660 A1 | 10/2014 | Teo et al. | |
| 2014/0307485 A1 | 10/2014 | Xu et al. | |
| 2016/0111961 A1* | 4/2016 | Balakrishnan | H02M 3/33507 363/21.12 |
| 2016/0124027 A1 | 5/2016 | Sambucco et al. | |
| 2016/0211755 A1 | 7/2016 | Chen et al. | |
| 2017/0222553 A1 | 8/2017 | Grbo et al. | |
| 2017/0302184 A1* | 10/2017 | Chen | H02M 1/08 |
| 2017/0302185 A1* | 10/2017 | Tao | H02M 3/33592 |

OTHER PUBLICATIONS

"HVLED815PF Offline LED driver with primary-sensing and high power factor up to 15 W," Datasheet—Production Data, STMicroelectronics, Feb. 2014, 34 pages.

"NCL30082 Dimmable Quasi-Resonant Primary Side Current-Mode Controller for LED Lighting with Thermal Fold-back," Product Specification, Semiconductor Components Industries, LLC, Jan. 2015, 35 pages.

"Primary-Side-Regulation LED Driver Controller with Active PFC—RT7304," Product Specification, Richtek Technology Corporation, Feb. 2015, 14 pages.

Adragna et al., "Primary-Controlled High-PF Flyback Converters Deliver Constant Dc Output Current," 14*th* European Conference on Power Electronics and Applications, Birmingham, United Kingdom, Aug. 30-Sep. 1, 2011, 10 pages.

Adragna, "Design Equations of High-Power-Factor Flyback Converters Based on the L6561," *AN1059 Application Note*, STMicroelectronics, 2003, 20 pages.

* cited by examiner

CURRENT CONVERTER WITH CONTROL ON THE PRIMARY WINDING SIDE AND COMPENSATION OF THE PROPAGATION DELAY

BACKGROUND

Technical Field

The present disclosure relates to a current converter with control of the current on the primary winding side and compensation of the propagation delay. In particular, the present disclosure regards a converter that may be used in a power supply aimed at the market of solid-state-lighting (SSL) apparatus, and more in particular to apparatus comprising lamps including arrays of light-emitting diodes (LEDs).

Description of the Related Art

Offline-driving power supplies of lighting apparatus that use LEDs comprise a control circuit and a transformer for maintaining a safety insulation between the control circuit and the load (LEDs). In these circuits, it is frequently desirable to regulate the d.c. output current used for driving the LEDs without making use of feedback circuits that use signals acquired on the secondary-winding side. In this way, on the secondary side of the transformer, there is no need of current-detection elements, reference-voltage sources or error amplifiers, nor possible optical couplers for transferring the error signal to the control circuit arranged on the primary side. Frequently, a high power factor (Hi-PF, higher than 0.9) is further desirable in order to meet the emission limits of current harmonics (according to the standards IEC 61000-3-2 in Europe and JEITA-MITI in Japan).

Figure 1:
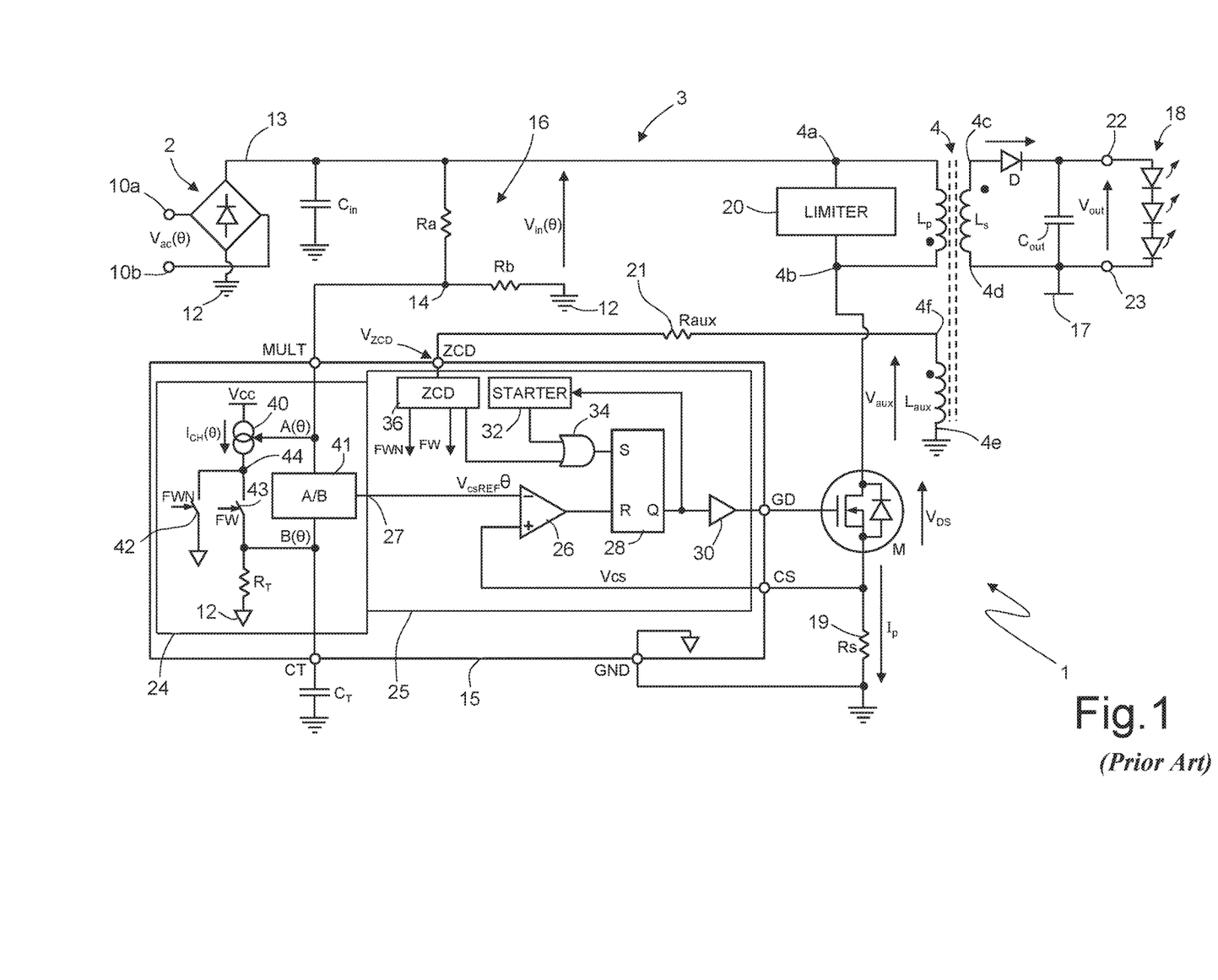
FIG. 1 shows a circuit diagram of a known switching power supply.

In order to obtain the above characteristics, switching converters of a Hi-PF flyback type are known, which are made, for example, according to the circuit scheme of FIG. 1 (see also C. Adragna "Primary-Controlled High-PF Flyback Converters Deliver Constant Dc Output Current" Europe Power Electronics Conference, September 2011, which are referred to for further details).

FIG. 1 shows a power supply 1 including a bridge rectifier 2 and a flyback converter 3.

The bridge rectifier 2 has two input terminals 10a, 10b, designed to receive an a.c. supply voltage $V_{ac}$ at a frequency $f_L$, and two output terminals supplying an input voltage $V_{in}(\theta)$, where $\theta$ is the phase of the supply voltage $V_{ac}$. The output terminals of the bridge rectifier 2 are connected to a first reference potential line (first ground 12) and to an input node 13, respectively.

The flyback converter 3 comprises a filtering capacitor $C_{in}$, connected between the input node 13 and the first ground 12 and operating as high-frequency smoothing filter; a transformer 4 including a primary winding $L_p$, a secondary winding $L_s$, and an auxiliary winding $L_{aux}$; a control module 15; a resistive divider 16 including a first dividing resistor $R_a$ and a second dividing resistor $R_b$; a power switch M, formed by a power transistor, for example a MOSFET; an auxiliary sensing resistor 21, having a resistance $R_{aux}$; a primary sensing resistor 19 having a resistance $R_s$; and a clamping circuit 20.

In detail, the primary winding $L_p$ of the transformer 4 has a first terminal 4a connected to the input node 13 and a second terminal 4b. The secondary winding $L_s$ has a first terminal 4c and a second terminal 4d, the latter connected to a second reference potential line (second ground 17). The auxiliary winding $L_{aux}$ has a first terminal 4e connected to the first ground 12 and a second terminal 4f. The primary, secondary and auxiliary windings $L_p$, $L_s$, $L_{aux}$ are coupled together as illustrated in FIG. 1, with positive terminals 4b, 4c, and 4f.

The first dividing resistor $R_a$ is connected between the input node 13 and an intermediate node 14. The second resistor $R_b$ has a first terminal connected to the intermediate node 14 and a second terminal connected to the first ground 12. The intermediate node 14 is coupled to a first input terminal MULT of the control module 15 and supplies a first voltage signal $A(\theta)$ proportional to the input voltage $V_{in}(\theta)$ through the dividing ratio $K_p = R_b/(R_a + R_b)$ of the resistive divider 16, according to Eq. (1) below:

$$A(\theta) = K_p V_{in,pk} \sin\theta \qquad (1)$$

where $V_{in,pk} = \sqrt{2} V_{in}$

The auxiliary sensing resistor 21 is connected between the second terminal 4f of the auxiliary winding $L_{aux}$ and a second input terminal ZCD of the control module 15. The primary sensing resistor 19 is connected between the source terminal of the power switch M and the first ground 12. Further, the source terminal of the power switch M is connected to a third input terminal CS of the control module 15 and supplies thereto a sensing voltage $V_{cs}(t,\theta)$, directly proportional to the current in the primary winding $L_p$ when the power transistor M is on, i.e., during magnetization of the primary winding $L_p$. In fact, the primary sensing resistor 19 detects the current $I_p(t,\theta)$ flowing in the primary winding $L_p$ when the power switch M is on.

The transistor M further has its drain terminal connected to the second terminal 4b of the primary winding $L_p$ and its gate terminal connected to an output terminal GD of the control module 15.

The clamping circuit 20 is arranged between the first and the second terminal 4a, 4b of the primary winding $L_p$ for limiting voltage spikes on the drain terminal of the switch M, caused, for example, by parasitic inductances.

On the side of the secondary winding $L_s$, the flyback converter 3 comprises an output diode D and an output capacitor $C_{out}$. The output capacitor $C_{out}$ is for example of an electrolytic type and has positive and negative plates coupled to a first output terminal 22 and to a second output terminal 23, which are in turn coupled to a load 18. The second output terminal 23 is coupled to the second ground 17. The output diode D has its anode connected to the first terminal 4c of the secondary winding $L_s$ and has its cathode connected to the first load terminal 22. The voltage across the output capacitor $C_{out}$ thus is an output voltage $V_{out}$ supplied to the load 18, here a series of diodes, for example LEDs.

The control module 15 comprises a reference current source stage 24 and a comparator stage 25.

In particular, the reference current source stage 24 (described in detail in patent application US 2013/0088897) has a first input connected to the first input terminal MULT of the control module 15, a second input connected to a fourth terminal CT of the control module 15, and an output 27 generating a reference voltage $V_{csREF}(\theta)$ variable as a function of the phase $\theta$ of the supply voltage $V_{ac}$, as explained in detail hereinafter.

The comparator stage 25 comprises a comparator 26, a latch flip-flop 28 of a set-reset type, a driver 30, a start-up circuit 32, a logic gate 34 of an OR type, and a zero-crossing detector (ZCD) 36.

The comparator 26 has an inverting input connected to the output 27 of the reference current source stage 24 and a non-inverting input connected to the third input terminal CS of the control module 15.

The output of the comparator 26 is connected to the reset input R of the flip-flop 28, the output Q whereof is connected to the input of the driver 30, coupled to the output terminal GD of the control module 15. The output Q of the flip-flop 28 is further connected to the set input of the flip-flop 28 through the start-up circuit 32. In detail, the input of the start-up circuit 32 is connected to the output Q of the flip-flop 28, and the output of the start-up circuit 32 is connected to a first input of the first logic gate 34. The first logic gate 34 has a second input connected to a first output of the ZCD circuit 36 and an output coupled to the set input of the flip-flop 28. The ZCD circuit 36 has an input connected to the second input terminal ZCD of the control module 15.

The reference current source stage 24 comprises a voltage-controlled current source 40 having a control terminal connected to the intermediate node 14; a voltage divider 41, connected between the intermediate node 14 and the fourth terminal CT of the control module 15; a first switch 42; a second switch 43; and a fourth resistor $R_T$.

The current source 40 has an output terminal 44 supplying a current $I_{CH}(\theta)$ proportional to the input voltage $V_{in}(\theta)$. The first switch 42 is connected between the output terminal 44 of the current source 40 and the first ground 12. The second switch 43 is connected between the output terminal 44 of the current source 40 and the fourth terminal CT of the control module 15. The fourth resistor $R_T$ is coupled between the fourth terminal CT of the control module 15 and the first ground 12 and generates a second voltage signal $B(\theta)$.

The switches 42, 43 are governed by phase signals FWN and FW of a logic type, equal and in phase opposition, generated by the ZCD circuit 36. The fourth terminal CT of the control module 15 is connected to an external capacitor $C_T$ of high value, chosen so that, at least to a first approximation, the a.c. component (at a frequency equal to twice the frequency of the supply voltage $V_{ac}$) of the second voltage signal $B(\theta)$ is negligible as compared to the d.c. component $B_0$. This condition is generally met also because in Hi-PF flyback converters the control loop has a bandwidth much lower than the frequency of the supply voltage $V_{ac}$.

Operation of the power supply 1 of FIG. 1 is described hereinafter, with reference to FIGS. 2 and 3, and is described in detail in the paper by C. Adragna referred to above.

It should be noted that, in the flyback converter 3, when operating in Hi-PF condition, the filtering capacitor $C_{in}$ does not operate as energy reservoir so that the input voltage $V_{in}$ is a rectified sinusoid ($Vin(\theta)=V_{in,pk}|\sin \theta|$ with $\theta \in (0,\pi)$).

In these conditions, the voltage $A(\theta)$ is proportional to the input voltage $V_{in}(\theta)$ according to Eq. (1). Furthermore, since, as mentioned above, the second voltage signal $B(\theta)$ may be approximated with the respective d.c. value $B_0$, the reference voltage $V_{csREF}(\theta)$ on the output of the voltage divider 41 is:

$$V_{csREF}(\theta) = K_D \frac{A(\theta)}{B_o} \quad (2)$$

where $K_D$ is a proportionality constant, equal to the gain of the voltage divider 41. The reference voltage $V_{csREF}(\theta)$ is thus a rectified sinusoidal voltage, the value whereof depends upon the effective value of the supply voltage $V_{ac}$ on the basis of Eq. (1).

The reference voltage $V_{csREF}(\theta)$ is compared by the comparator 26 with the sensing voltage $Vcs(t,\theta)$, which is proportional to the current $I_p(t,\theta)$ in the primary winding $L_p$ and in the switch M, when the latter is on.

Assuming that the switch M is initially closed, the current $I_p(t,\theta)$ through the primary winding $L_p$ is initially increasing, as is the sensing voltage $Vcs(t,\theta)$. When the latter reaches the reference voltage $V_{csREF}(\theta)$, the comparator 26 switches and resets the output of the flip-flop 28. The power switch M is thus turned off. In this way, the first voltage signal $A(\theta)$, which as said has a rectified sinusoid shape, determines the peak value of the current $I_p(t,\theta)$ in the primary winding $L_p$, which is thus enveloped by a rectified sinusoid.

When the switch M turns off, the energy stored in the primary winding $L_p$ is transferred by magnetic coupling to the secondary winding $L_s$ and thus to the output capacitor $C_{out}$ and to the load 18 until the secondary winding $L_s$ is demagnetized completely.

After switching off of the switch M and as long as current flows in the secondary winding $L_s$, the voltage of the drain terminal of the switch M is equal to $V_{in}(\theta)+V_R$, where $V_R$ is the so-called reflected voltage, equal to $n \cdot V_{out}$, where n is equal to the ratio between the number of the turns of the primary winding $L_p$ and the number of the turns of the secondary winding $L_s$ of the transformer 4.

After demagnetization of the secondary winding $L_s$, the diode D switches off and the drain terminal of the switch M becomes floating and tends to assume a voltage equal to the instantaneous value of the input voltage $V_{in}(\theta)$, through damped oscillations caused by a parasitic capacitance resonating with the primary winding $L_p$. However, the rapid voltage drop on the drain terminal of the switch M following demagnetization of the transformer 4 is coupled to the second input terminal ZCD of the control module 15 and thus to the ZCD circuit 36 through the auxiliary winding $L_{aux}$ and the third resistor $R_{aux}$, as described in greater detail hereinafter.

The ZCD circuit 36 generates a pulse S on its output connected to the comparator 26 whenever it detects that a falling edge of the voltage on the second input terminal ZCD of the control module 15 drops below a threshold ($V_{ZCDt}$ in FIG. 2). This pulse forces setting of the flip-flop 28, the output of which switches, turning on the power switch M and causing start of a new switching cycle.

The start-up circuit 32 enables, through the logic gate 34, starting of the first switching cycle after turning-on of the flyback converter 3, i.e., when no signal is yet present on the second input terminal ZCD of the control module 15, and further prevents the flyback converter 3 from remaining blocked if for some reason the signal on the second input terminal ZCD of the control module 15 is lost.

Figure 2:
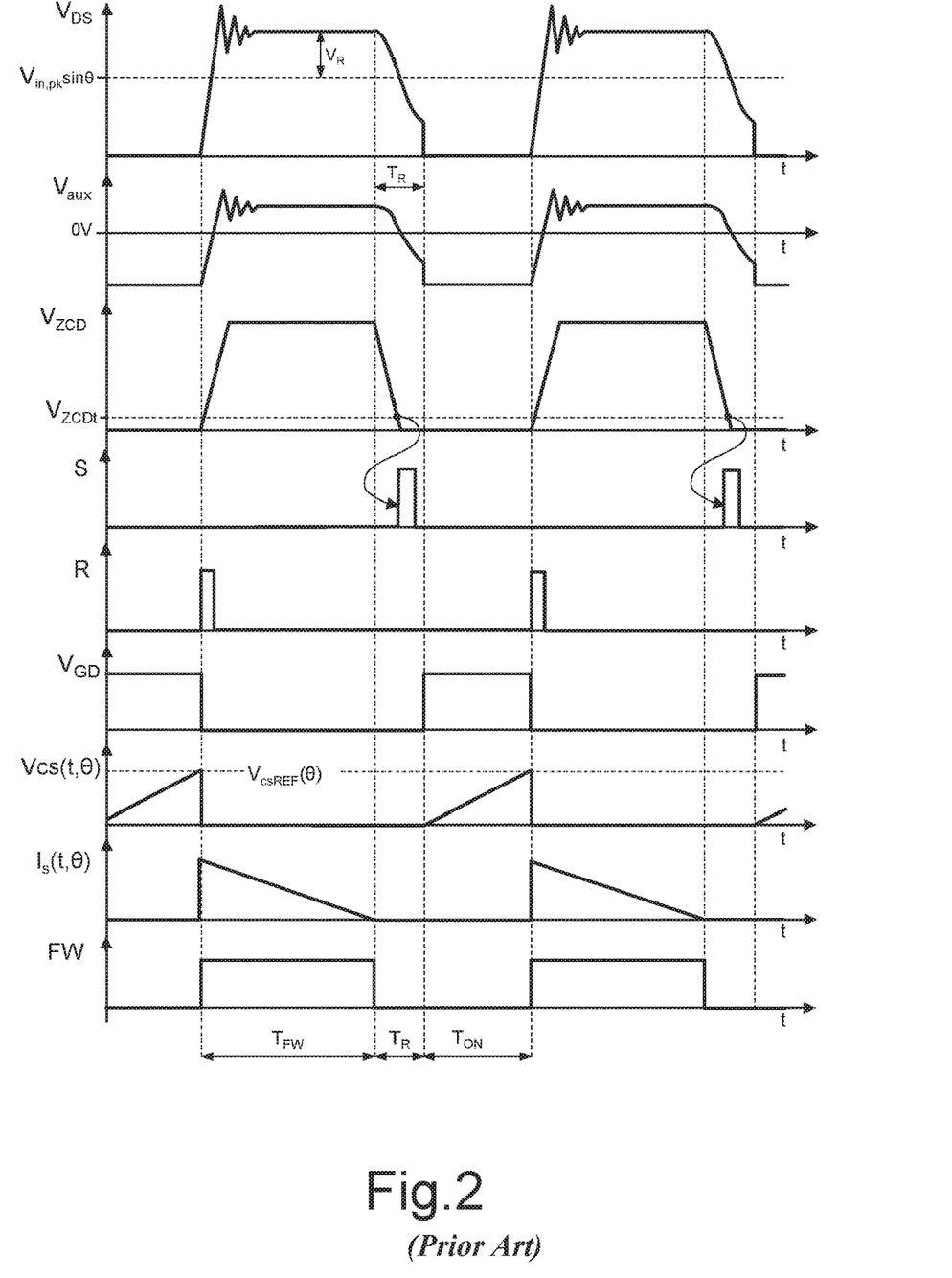
FIGS. 2-4 show time plots of signals generated within the switching power supply illustrated in FIG. 1.

The ZCD circuit 36 also generates the phase signals FW and FWN, which are supplied to the switches 42, 43 (as illustrated in FIG. 2 for the signal FW). In detail, the phase signal FW is high during transformer demagnetization and is used for generating the correct value of the second voltage signal $B(\theta)$ so as to regulate the desired value of the d.c. output current, as demonstrated in the cited paper by C. Adragna.

In the circuit of FIG. 1, when the switch M is on, the second input terminal ZCD of the control module 15 is connected (by a controller—not illustrated) to the first ground 12. Thus, the voltage across the auxiliary sensing resistor 21 is equal to the auxiliary voltage $V_{max}$ on the auxiliary winding $L_{aux}$. In this period, the voltage drop on the primary sensing resistor 19 and on the switch M is negligible, and the input voltage $V_{in}$ is substantially entirely applied on the primary winding $L_p$, between the terminals 4a and 4b. Consequently, the auxiliary voltage $V_{aux}$ and the current in the auxiliary sensing resistor 21 are proportional to the input voltage $V_{in}$.

When the switch M turns off, the second input terminal ZCD of the control module 15 is decoupled from the first ground 12, and the voltage $V_{ZCD}$ on the second input terminal ZCD follows the plot of the output voltage $V_{out}$ according to a proportionality coefficient linked to the turn ratio between the secondary winding $L_s$ and the auxiliary winding $L_{aux}$. After demagnetization of the secondary winding $L_s$, in particular, the voltage on the second input terminal ZCD tends to rapidly drop, as the current in the auxiliary sensing resistor 21, as illustrated in detail in FIG. 2.

Examples of the signals generated in the flyback converter 3 are represented in FIG. 2, where some quantities that follow the pattern of the input voltage $V_{in}$ have rectilinear stretches, given that the switching frequency $f_s$ (of the order of kilohertz) is much higher than the frequency $f_L$ of the input voltage $V_{in}$ (generally, 50-60 Hz).

In particular, FIG. 2 shows the following quantities:
the voltage $V_{DS}$ between the drain and source terminals of the switch M;
the voltage $V_{in,pk}$ sin θ, where $V_{in,pk}$ is the peak value of the input voltage $V_{in}$;
the voltage $V_{aux}$ on the auxiliary winding $L_{aux}$;
the voltage $V_{ZCD}$ on the second input terminal ZCD of the control module 15;
the threshold $V_{ZCDt}$ of the voltage $V_{ZCD}$ where the ZCD circuit 36 generates a pulse supplied to the logic gate 34;
the set and reset pulses S, R supplied to the flip-flop 28;
the voltage $V_{GD}$ supplied on the output terminal GD of the control module 15 and driving turning-on and turning-off of the switch M;
the sensing voltage Vcs(t,θ);
the current $I_s(t,θ)$ in the secondary winding $L_s$; and
the freewheel phase signal FW, when demagnetization of the transformer 4 occurs.

Furthermore, FIG. 2 highlights the following periods:
the period $T_{ON}$, when the switch M is on, thus representing the magnetization period of the core of the transformer 4;
the period $T_{FW}$, when the core of the transformer 4 demagnetizes; and
the period $T_R$, i.e., the period that elapses between complete demagnetization of the core of the transformer 4 and subsequent turning-on of the switch M, i.e., start of the new magnetization of the core of the transformer 4.

The switching period T is thus given by $T(θ)=T_{FW}(θ)+T_R+T_{ON}$.

Figure 3:
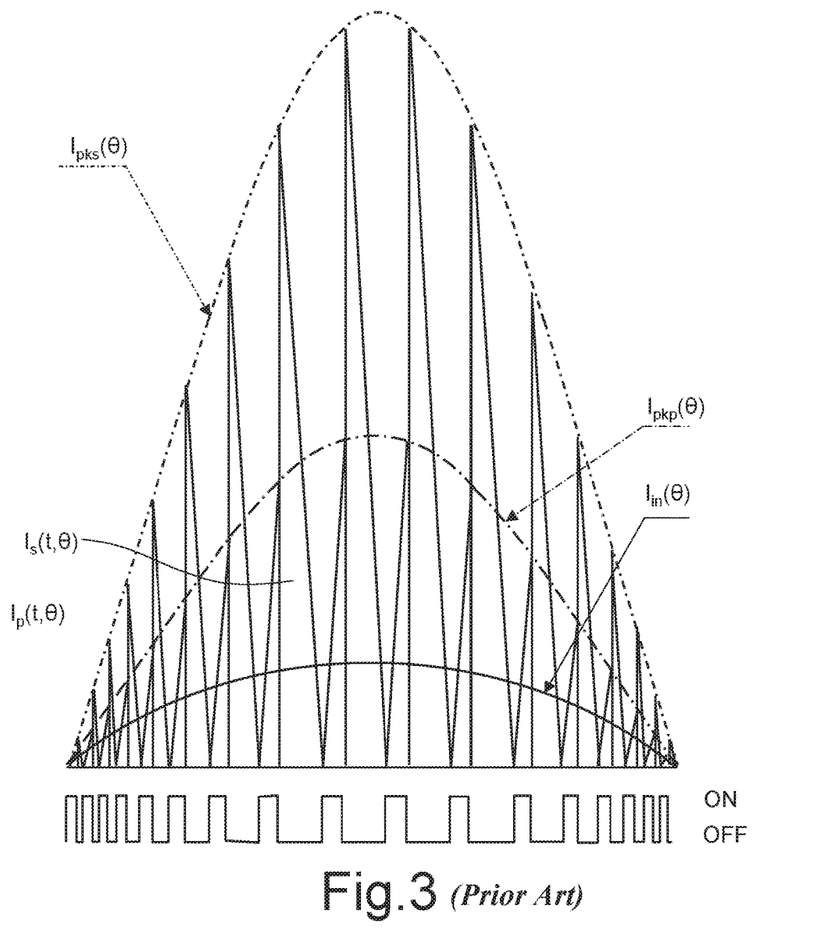

The resulting plots of the currents $I_p(t,θ)$, $I_s(t,θ)$, as well as the corresponding envelopes of the corresponding peaks $I_{pkp}(θ)$, $I_{pks}(θ)$ and the cycle-by-cycle average $I_{in}(θ)$ of the current in the primary winding $L_p$ are represented in FIG. 3.

For practical purposes, the flyback converter 3 is of the quasi-resonant type. In fact, turning-on of the transistor M is synchronized with the instant of complete demagnetization of the transformer 4 (i.e., with the instant when the current in the secondary winding $L_s$ goes to zero), albeit with a delay. Turning-off of the transistor M is instead theoretically determined by detecting when the current $I_p$ in the primary winding $L_p$ reaches the provided threshold ($V_{csREF}(θ)/R_s$). Furthermore, the flyback converter 3 is of the current-mode control type, and in particular of the peak-current-mode control type. Again, since the peak envelope of the current flowing in the sensing resistor $R_s$ and thus in the primary winding $L_p$ is sinusoidal, a power factor higher than 0.9 is obtained.

As shown in the paper by C. Adragna referred to above, the regulated d.c. output current $I_{out}$ that flows in the load 18 is given by:

$$I_{out} = \frac{nK_D}{2R_S G_M R_T}. \quad (3)$$

where n is the turn ratio between the primary winding $L_p$ and the secondary winding $L_s$ of the transformer 4, $K_D$ is the gain of the divider 41 (see Eq. (2)) and $G_M$ is the transconductance of the current source 40. Consequently, with the instant control scheme that uses only quantities available on the primary winding $L_p$ side of the transformer 4, the mean output current $I_{out}$ depends ideally only upon external parameters, that may be selected by the user, such as n and $R_s$, or by fixed parameters such as $G_M$, $R_T$, and $K_D$ and does not depend upon the output voltage $V_{out}$ or the input voltage $V_{in}$ or upon the switching frequency $f_s=1/T(θ)$.

Figure 4:
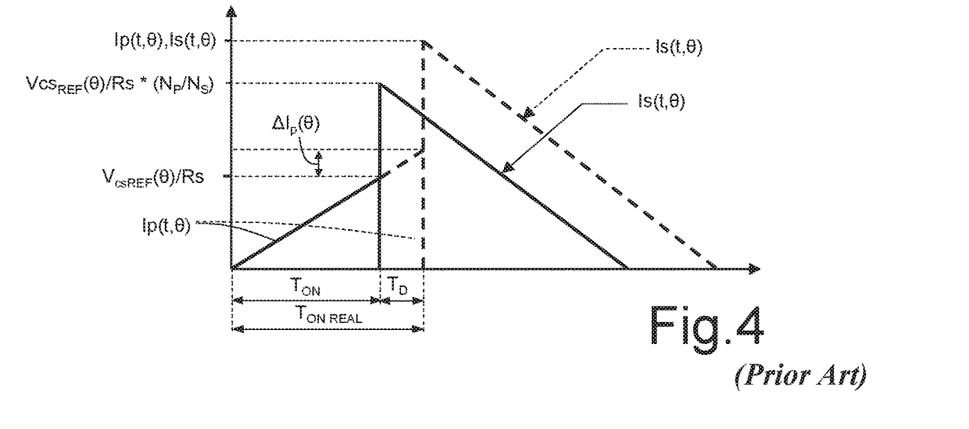

In the circuit of FIG. 1, however, due to propagation delays, the transistor M does not turn off immediately when the sensing voltage Vcs(t,θ) reaches the reference voltage $V_{csREF}(θ)$, i.e., when the current $I_p(t,θ)$ in the primary winding $L_p$ reaches the provided threshold $V_{csREF}(θ)/R_s$, but remains turned on for a further time, referred to as "total propagation delay $T_D$", as represented in FIG. 4. In particular, the total propagation delay $T_D$ is given by the sum of the switching delay of the comparator 26, the propagation delay of the driver 30, and the turning-off delay characteristic of the power switch M. It follows that the peak current in the primary winding $L_p$ is higher, as compared to the ideal value, by a quantity $ΔI_p(θ)$ equal to:

$$ΔI_P(θ) = \frac{Vin(θ)T_D}{L_P}. \quad (4)$$

and thus the regulated d.c. output current $I_{out}$ increases with the effective value of the input voltage $V_{in}$.

Figure 5:
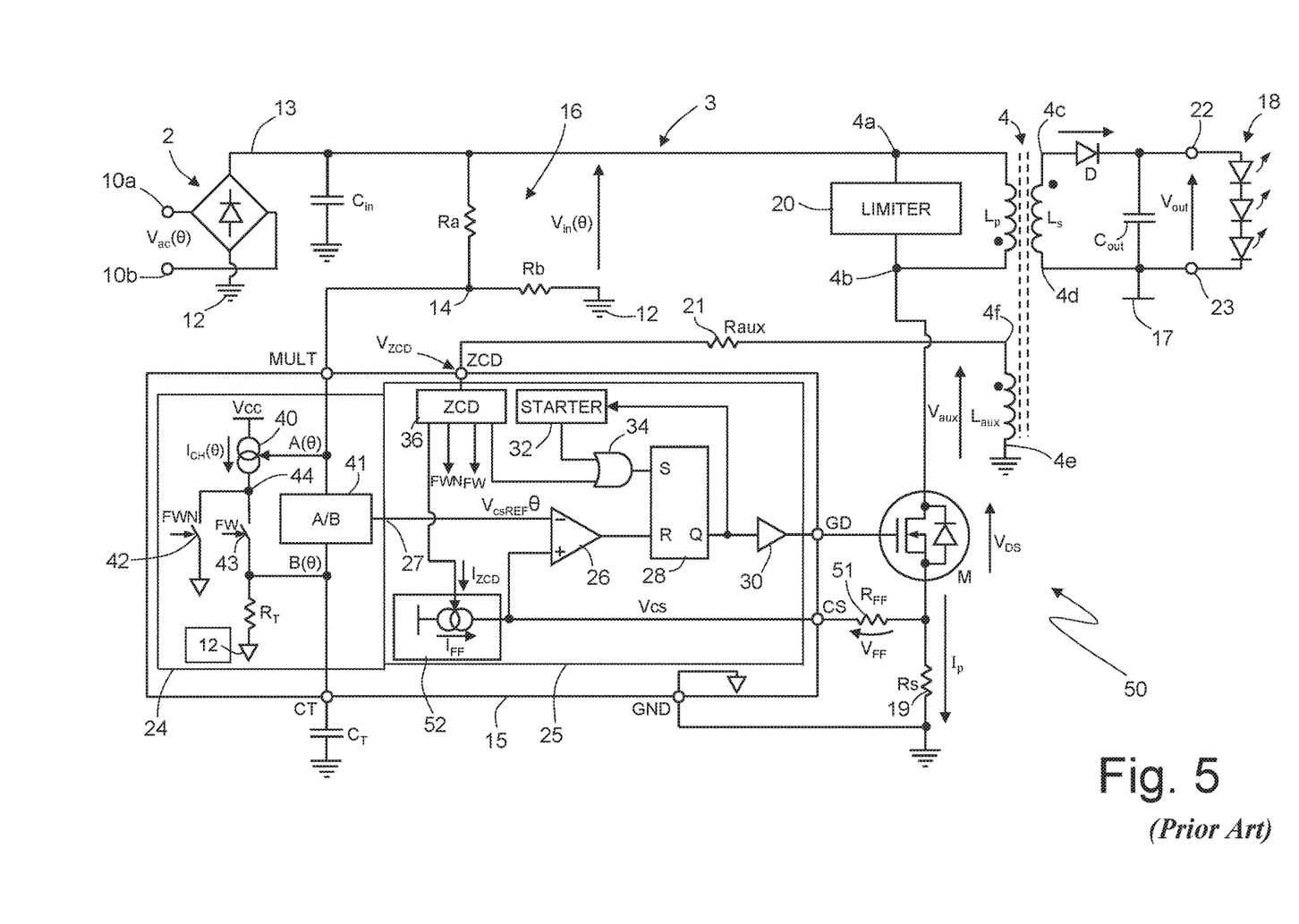
FIG. 5 shows a circuit diagram of another switching power supply.

To compensate for the increase in the peak current linked to the input voltage $V_{in}$, in power supplies available on the market, a positive offset voltage proportional to the input voltage $V_{in}$ is added to the sensing voltage Vcs(t,θ), as illustrated in FIG. 5.

FIG. 5 shows a flyback power supply 50 similar to the power supply 1 of FIG. 1. Consequently, the elements of the flyback power supply 50 that are in common with those of the diagram of FIG. 1 are designated by the same reference numbers and the description thereof will not be repeated.

The flyback power supply 50 comprises a feed-forward resistor 51, having a resistance $R_{FF}$ and connected between the source terminal of the switch M and the third input terminal CS of the control module 15; and a feed-forward current source 52, generating the feed-forward current $I_{FF}$ and governed by a control current $I_{ZCD}$, which is generated by the ZCD circuit 36 and is proportional to the auxiliary current $I_{aux}$ flowing in the auxiliary sensing resistor 21 during the time period when the switch M is on. For example, the control current $I_{ZCD}$ is equal to the auxiliary current $I_{aux}$ and is generated via a current mirror circuit.

On this hypothesis, since, as has been mentioned, during the on period $T_{ON}$ of the transistor M, the second input terminal ZCD of the control module 15 is connected to the first ground 12, the auxiliary current $I_{aux}$ and the control current $I_{ZCD}$ flowing in the auxiliary sensing resistor 21 are:

$$I_{aux}(\theta) = I_{ZCD}(\theta) = \frac{mVin(\theta)}{R_{aux}} \tag{5}$$

where m is the turn ratio between the auxiliary winding $L_{aux}$ and the primary winding $L_p$.

The feed-forward current source $I_{FF}$ is a current mirror that generates a current proportional to the current $I_{ZCD}$ according to the relation:

$$I_{FF}(\theta) = K_{FF} I_{ZCD}(\theta)$$

where $K_{FF}$ is the gain of the current mirror.

The feed-forward current $I_{FF}$ is supplied to the feed-forward resistor 51, which generates an additional feedback voltage $V_{FF}$. Setting $R_{FF} \gg R_S$, we have:

$$V_{FF}(\theta) = K_{FF} m \frac{R_{FF}}{R_{aux}} Vin(\theta). \tag{6}$$

Imposing that the additional feedback voltage $V_{FF}$ is equal to the voltage step due to the propagation delays:

$$\Delta V_{CS}(\theta) = R_S \Delta I_P(\theta) = V_{FF}(\theta)$$

and combining with Eq. (4), we obtain the resistance value $R_{FF}$ of the feed-forward resistor useful for obtaining a compensation:

$$R_{FF} = \frac{1}{K_{FF}} \frac{1}{m} \frac{R_{aux} R_S}{L_P} T_D. \tag{7}$$

Figure 6:
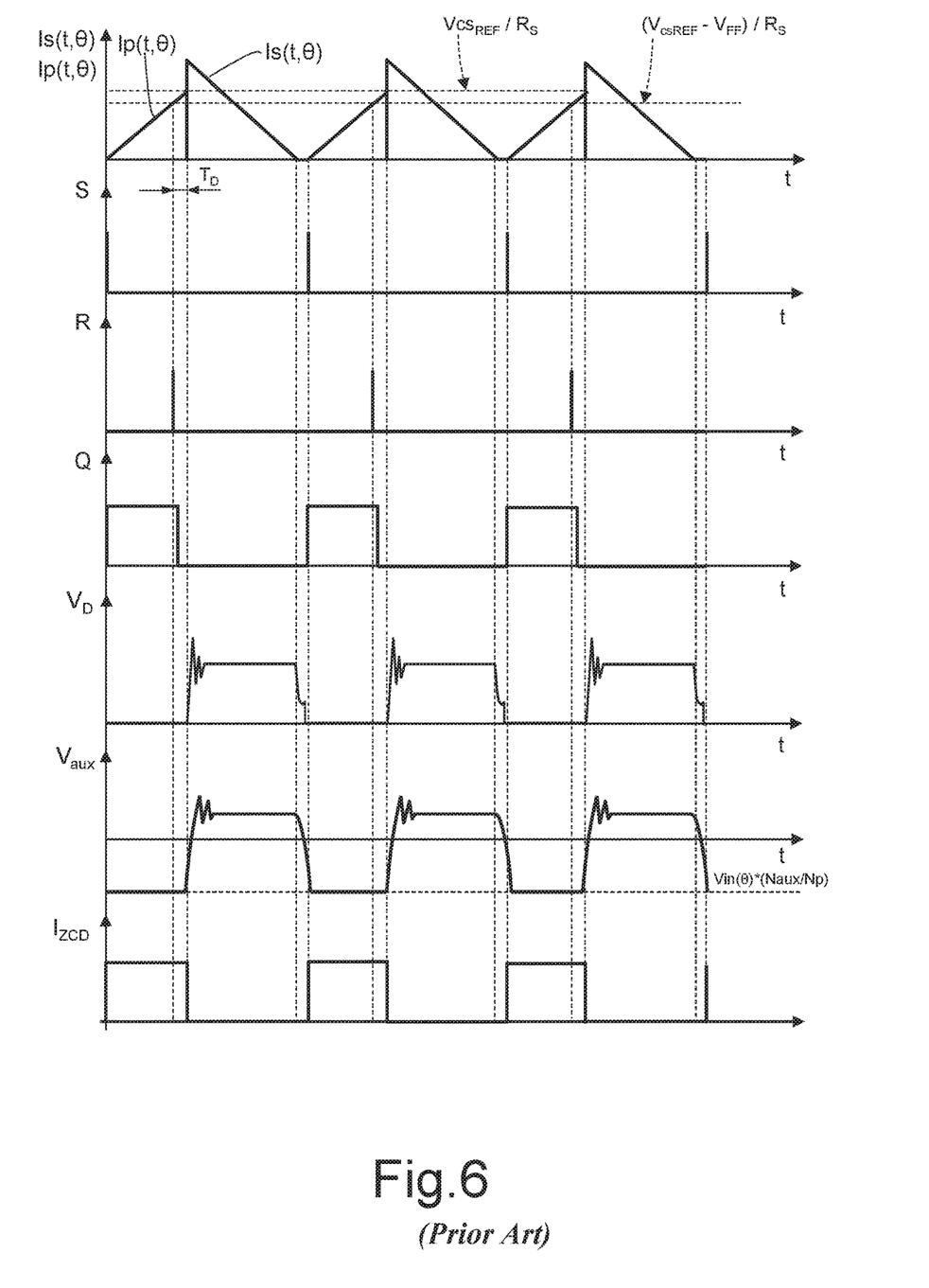
FIG. 6 shows the time plots of some quantities of the circuit of FIG. 5.

In practice, the voltage supplied to the comparator 26 is increased, with respect to the voltage $V_p$ on the primary sensing resistor 19, by a value such as to anticipate switching of the comparator 26 by a time equal to the total propagation delay $T_D$. In this way, when the comparator 26 switches, the current $I_P$ flowing in the primary sensing resistor 19 is lower than the threshold value, and when the power switch M turns off with a delay $T_D$, the current $I_p$ has reached the desired threshold value, as illustrated in FIG. 6.

It follows that the variation of the output current supplied by the secondary winding $L_s$ proportional to the input voltage $V_{in}$ due to the total propagation delay may be compensated thereby if the total propagation delay $T_D$ is constant. However, if the total propagation delay $T_D$ varies, also this compensation is not sufficient.

This is a problem in solid-state lighting apparatuses, where it is increasingly important to obtain a high accuracy in the d.c. output current, with values even lower than ±3%, which cannot always be achieved with the compensation technique represented in FIG. 5.

In addition, the described power supply is used with different power transistors M, according to the applications and requirements of the users. The power transistors M available on the market have similar static characteristics, in particular similar saturation resistance $R_{DS-on}$, but different switching characteristics, in particular a different switching time. It follows that the output current varies according to the power transistor being used. This requires a modification and an adaptation of the value of the feed-forward resistor 51, on the basis of Eq. (7), according to the applications and to the power switch used. This setting is, however, complex and costly.

BRIEF SUMMARY

One embodiment of the present disclosure is a current converter that generates a d.c. output current irrespective both of the variations of the supply voltage $V_{ac}$ and of variations in the propagation delay.

According to the present disclosure, a control circuit for a switch for a switching current converter, a switching power supply, and a corresponding control method are provided.

One embodiment of the present application is a control circuit that is based upon the principle of supplying a feed-forward current proportional not only to the input voltage $V_{in}$, but also to the total propagation delay $T_D$. In particular, the present power supply supplies the feed-forward resistor 51 with a compensation current $I_{COMP}$:

$$I_{COMP}(\theta, T_D) = K_{FF\,0} Vin(\theta) T_D \tag{8}$$

where $K_{FFO}$ is a constant.

To do this, imposing that the positive offset $R_{FF} I_{FF}(\theta, T_D)$ is equal to the sensing-voltage step due to the propagation delay $\Delta V_{CS}(\theta) = R_S \Delta I_P(\theta)$ and taking into account Eq. (4), it results:

$$R_{FF} K_{FF0} Vin(\theta) T_D = R_S \frac{Vin(\theta) T_D}{L_P}. \tag{9}$$

Eq. (9) shows that the input voltage $V_{in}$ and the total propagation delay $T_D$ may both be compensated by using a feed-forward resistor 51 having a resistance $R_{FF}$ of:

$$R_{FF} = \frac{R_s}{L_P} \frac{1}{K_{FF0}}. \tag{10}$$

BRIEF DESCRIPTION OF THE SEVERAL VIEWS OF THE DRAWINGS

For a better understanding of the present disclosure, a preferred embodiment thereof is now described, purely by way of non-limiting example, with reference to the attached drawings, wherein.

DETAILED DESCRIPTION

Figure 7:
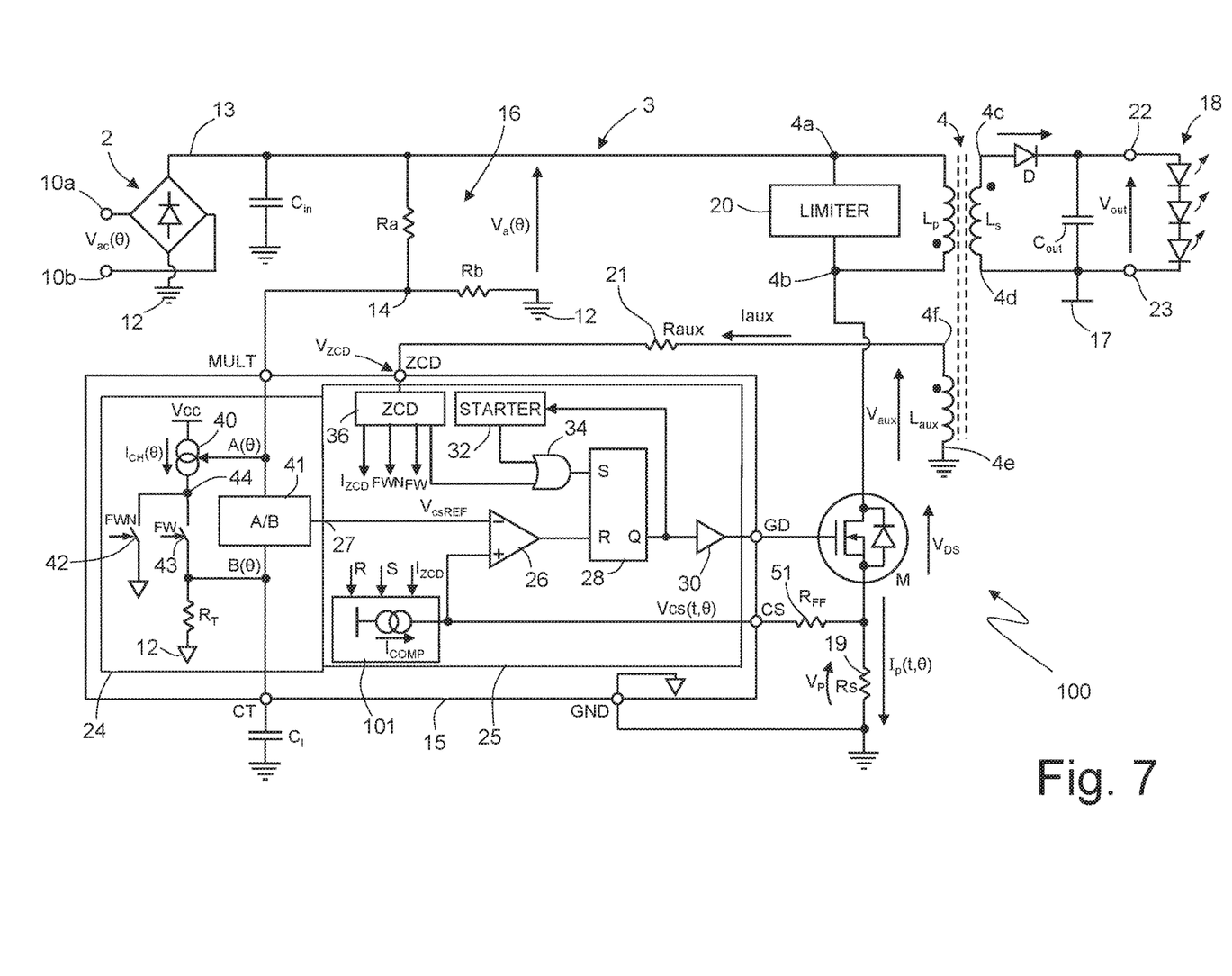
FIG. 7 shows a simplified circuit diagram of an embodiment of the present switching power supply.

FIG. 7 shows a switching power supply 100 having a similar general structure as the power supply 50 of FIG. 5.

Consequently, the elements of the switching power supply 100 that are in common with the diagram of FIG. 5 (and thus the diagram of FIG. 1) are designated by the same reference numbers and will not be described again.

The switching power supply 100 comprises a current source stage 101 shown in detail in FIG. 7A and receiving the control current $I_{ZCD}$ supplied by the ZCD circuit 36 and the set and reset signals S, R (referred to hereinafter also as duty-cycle set and reset signals S, R) generated respectively by the logic gate 34 and by the comparator 26 (referred to hereinafter also as duty-cycle comparator 26) and generates a compensated current $I_{COMP}$.

Figure 7A:
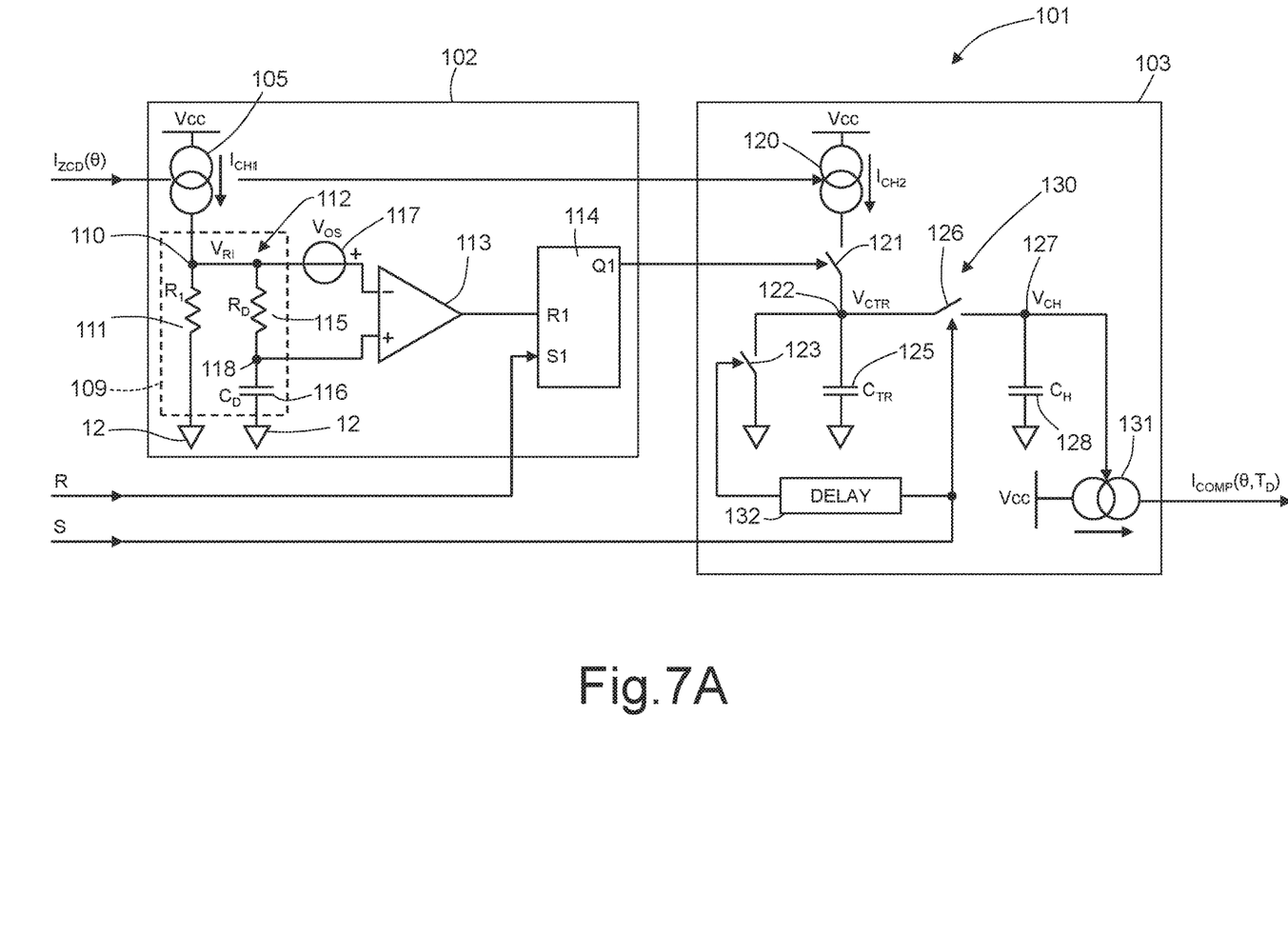
FIG. 7A shows a generator block used in the circuit diagram of FIG. 7.

With reference to FIG. 7A, the current source stage 101 comprises a delay estimation block 102 and a current source block 103.

The delay estimation block 102 comprises a first current mirror generator 105 controlled by the control current $I_{ZCD}$ and supplying at an output 110 a first mirror current $I_{CH1}$ proportional, in particular equal, to the control current $I_{ZCD}$; an auxiliary comparison network 109; an estimation comparator 113; and a latch flip-flop 114 of a set/reset type.

The auxiliary comparison network 109 comprises an auxiliary current sensing resistor 111, coupled between the output 110 of the first current mirror generator 105 and the first ground 12 and having a resistance $R_1$, and a filter branch 112, connected in parallel to the auxiliary current sensing resistor 111.

The filter branch 112 in turn comprises a filter resistor 115, having a resistance $R_D$, and a filter capacitor 116, having a capacitance $C_D$, which are connected together in series and define an intermediate node 118. The filter resistor 115 is connected between the output 110 of the first current mirror generator 105 and the intermediate node 118. The filter capacitor 116 is connected between the intermediate node 118 and the first ground 12. An offset voltage source 117 for generating a voltage offset of a few tens of millivolts is arranged between the output 110 of the first current mirror generator 105 and an inverting input of the estimation comparator 113. The estimation comparator 113 further has a non-inverting input directly coupled to the intermediate node 118 and an output connected to a reset input R1 of the latch flip-flop 114. The latch flip-flop 114 further has a set input S1 receiving the reset signal R generated by the flip-flop 28 (FIG. 7) and regulates the duty-cycle of the switch M; thus it is referred to hereinafter also as duty-cycle flip-flop 28. The latch flip-flop 114 further has its output Q1 connected to the current source block 103.

The current source block 103 comprises a second current mirror generator 120 receiving the control current $I_{ZCD}$ and outputting a second mirror current $I_{CH2}$ proportional, in particular equal, to the control current $I_{ZCD}$; a control switch 121 coupled between the output of the second current mirror generator 120 and a control node 122; a discharge switch 123, arranged between the control node 122 and the first ground 12; a charging capacitor 125, having a capacitance C and arranged between the control node 122 and the first ground 12; a transfer switch 126, coupled between the control node 122 and a transfer node 127; and a hold capacitor 128, having a capacitance $C_H$ and coupled between the transfer node 127 and the first ground 12. The charging capacitor 125, the transfer switch 126, and the hold capacitor 128 form a memory element 130 of a track-and-hold type, as explained in detail hereinafter.

The output node 127 is further coupled to a control input of a compensation current source 131, which outputs the compensation current $I_{COMP}$ supplied to the feed-forward resistor 51 of FIG. 7. The current source block 103 further receives the set signal S generated by the logic gate 34 of FIG. 7 and fed to a control input of the transfer switch 126 and, through a delay element 132, to a control input of the discharge switch 123.

Operation of the circuit of FIG. 7, 7A is described hereinafter.

The reset signal R generated by the duty-cycle comparator 26 (FIG. 7) when the sensing voltage $V_{cs}$ on the primary sensing resistor 19 reaches the reference value $V_{csREF}$, sets the latch flip-flop 114, which is reset by the estimation comparator 113 after a time equal to the estimate of the total propagation delay $T_D$, as explained hereinafter.

In fact, the first current mirror generator 105 supplies the auxiliary comparison network 109 with a first mirror current $I_{CH1}$ equal to the control current $I_{ZCD}$. By choosing the values of resistance $R_1$, $R_D$ of the resistors 111, 115 so that $R_1 \ll R_D$ and by choosing the value of capacitance $C_D$ of the filter capacitor 116 so that the filter branch 112 forms a lowpass filter with a time constant of the order of nanoseconds, in steady-state conditions, the current $I_{CH1}$ supplied by the first current mirror generator 105 flows practically entirely in the first auxiliary current sensing resistor 111 so that the voltage on the output node 110 of the first current mirror generator 105 is:

$$V_{R1}(\theta) = R_1 I_{ZCD}(\theta).$$

Instead, the filter branch 112 supplies the estimation comparator 113 with a voltage value correlated to the delayed value of the first mirror current $I_{CH1}$ and thus of the control current $I_{ZCD}$.

Figure 8:
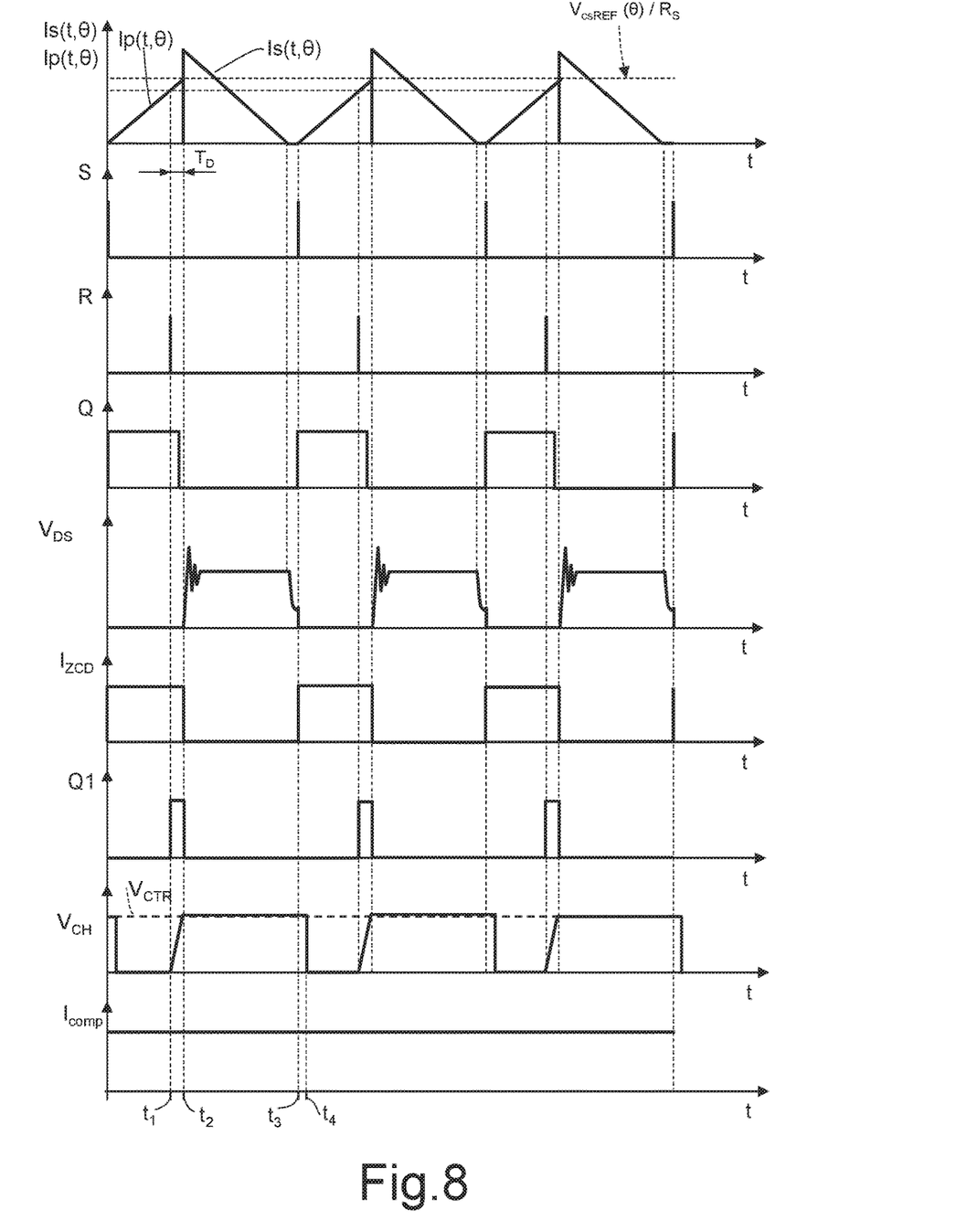
FIG. 8 shows the time plots of some quantities of the power supply of FIGS. 7 and 7A.

In this way, the auxiliary comparison network 109 supplies the estimation comparator 113 with a signal correlated to the instantaneous value and with a delayed signal of the auxiliary current $I_{aux}$, to enable detection of the instant when the auxiliary current $I_{aux}$ drops (knee of the curve of FIG. 8).

In detail, by virtue of the offset voltage generated by the source 117, when the switch M is off (period $t_0$-$t_1$ in the timing of FIG. 8), the inverting input of the estimation comparator 113 is at a higher potential than the non-inverting input, and the output R1 of the estimation comparator 113 is low. This behavior repeats throughout the half-period of the input voltage $V_{in}$, in view of its frequency $f_L$, much lower than the switching frequency $f_s$.

As soon as the duty-cycle comparator 26 switches and the duty-cycle reset signal R goes high (instant $t_1$), the estimation flip-flop 114 switches, and its output signal Q1 goes high.

At the instant $t_2$, when the transistor M turns off (with a delay equal to the total propagation delay $T_D$, as explained above), the auxiliary current $I_{aux}$ drops, as do the control current $I_{ZCD}$, as represented in the plot of FIG. 8, and thus the first mirror current $I_{CH1}$, thus determining a sharp voltage reduction on the output 110 of the first current mirror generator 105 and thus switching of the estimation comparator 113, which resets the estimation flip-flop 114, the output Q1 of which goes low.

It follows that the output Q1 of the estimation flip-flop 114 has a pulse with a width equal to the total propagation delay $T_D$ and thus represents a delay estimation signal, a parameter (pulse width) whereof is correlated to the total propagation delay $T_D$.

The output Q1 of the estimation flip-flop 114 controls turning on and off of the control switch 121. Precisely, as soon as the output signal Q1 of the estimation flip-flop 114 turns high (instant $t_1$), when the sensing voltage $V_{cs}$ on the inverting input of the duty-cycle comparator 26 reaches its threshold value ($V_{csREF}$), the control switch 121 closes and the second mirror current $I_{CH2}$, equal to the control current $I_{ZCD}$ and generated by the second current mirror generator 120, flows to the charging capacitor 125, thus charging it (in this step, the duty-cycle set signal S is low and thus the discharge switch 123 and the transfer switch 126 are open). The control voltage $V_{CTR}$ on the charging capacitor 125 thus increases proportionally to the control current $I_{ZCD}$ and to the auxiliary current $I_{aux}$. As soon as the output signal Q1 of the estimation flip-flop 114 switches to low (instant $t_2$), the control switch 121 opens and the second current mirror generator 120 interrupts charging of the charging capacitor 125. Consequently, the charging capacitor 125 is charged for an estimated period $T_C$ equal to the total propagation delay $T_D$ with a current equal to the control current $I_{ZCD}$ and proportional to the input voltage $V_{in}$.

Assuming, as for the circuit of FIG. 1, that the switching frequency $f_s=1/T(\theta)$ is much higher than the frequency $f_L$ of the input signal $V_{in}$, the control current $I_{ZCD}$ and thus the second mirror current $I_{CH2}$ may be considered constant during the estimated delay $T_C$ in which the charging capacitor 125 is charged, and thus charging capacitor 125 charges linearly.

The peak voltage $V_{CTR\_PEAK}(\theta)$ reached by the charging capacitor 125 is thus:

$$V_{CTR\_PEAK}(\theta) = \frac{I_{ZCD}(\theta)}{C_{TR}} T_C. \quad (11)$$

The discharge switch 123 and the transfer switch 126 remain open until a subsequent pulse of the duty-cycle set signal S is received (instant $t_3$) so that the charging capacitor 125 maintains the value $V_{CTR\_PEAK}(\theta)$.

At instant $t_3$, the duty-cycle set signal S switches to high, causing the transfer switch 126 to immediately close and connect the charging capacitor 125 to the output capacitor 128. Assuming that the output capacitor 128 has a capacitance $C_H$ much lower than capacitance $C_{TR}$ of the charging capacitor 125, it charges rapidly to the peak voltage $V_{CTR\_PEAK}(\theta)$ of the charging capacitor 125.

In practice, by combining Eq. (11) with Eq. (5), the control voltage $V_{CH}$ across the output capacitor 128 is given by:

$$V_{CH}(\theta) = \frac{mVin(\theta)}{R_{aux}} \frac{1}{C_{TR}} T_C.$$

which is proportional to the product of the input voltage $V_{in}$ and the estimated delay $T_C$, approximately equal to the total propagation delay $T_D$, so that:

$$V_{CH}(\theta) = \frac{mVin(\theta)}{R_{aux}} \frac{1}{C_{TR}} T_D.$$

The compensation-current source 131 thus generates the compensation current $I_{COMP}$ proportional to the control voltage $V_{CH}$, as follows:

$$I_{COMP}(\theta, T_D) = g_{FF} \frac{m}{R_{aux}} \frac{1}{C_{TR}} Vin(\theta) T_D \quad (12)$$

where $g_{FF}$ is the current-to-voltage gain of the compensation-current source 131.

As soon as the duty-cycle set signal S switches again to low, the transfer switch 126 opens again, disconnecting the output capacitor 128 from the charging capacitor 125.

In the current source block 103, the duty-cycle set signal S is supplied with a slight delay (instant $t_4$) also to the discharge switch 123, which, when it closes, connects the charging capacitor 125 to ground, discharging it rapidly, and then opens again. In the short period of time when the discharge switch 123 is closed, the charging capacitor 125 is disconnected from the output capacitor 128, which thus remains charged to the value of the control voltage $V_{CTR}$ previously stored. In this way, the charging capacitor 125 is discharged and recharged to a new value of the control voltage $V_{CTR}$ at each switching cycle, as illustrated in FIG. 8, thus guaranteeing cycle-by-cycle adaptation to possible modified conditions in the input voltage $V_{in}$ or in the total propagation delay $T_D$.

The compensation current $I_{COMP}$ supplied by the current source stage 101 is thus proportional to the product of the input voltage $V_{in}$ and the total propagation delay $T_D$.

The switching power supply described herein thus enables compensation of the propagation delay due to the driver 30 and to switching of the switch M (the delay due to the duty-cycle comparator 26 is much lower than the two previous delays and thus negligible) with an adaptive solution that does not require appropriate setting in case of replacement of the power switch M and is independent of the input voltage $V_{in}$.

Finally, it is clear that modifications and variations may be made to the circuit described and illustrated herein, without thereby departing from the scope of the present disclosure.

In particular, the described solution may be applied also to converters of a different type, including current control without output current reading, for example in converters of a buck and buck-boost type.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control module configured to be coupled to a switching converter including an inductive element, a switching element, and a sensor element configured to generate a sensing signal based on a current in the inductive element, the switching converter configured to receive an input quantity and having a switching cycle, and the control module further configured to compare a reference signal with a comparison signal that is based on the sensing signal and to generate a switching element off signal for turning off the switching element, the switching element having a propagation delay with respect to the switching element off signal and a turning off of the switching element, the control module further configured to sense the propagation delay and to estimate a value of the propagation delay each switching cycle of the switching converter, and configured to generate a compensation signal based on the input quantity and the estimated value of the propagation delay in the switching cycle, and further configured to configured to receive the reference signal, the sensing signal, and the compensation signal, and to generate the switching element off signal with an advanced timing based on the input quantity and the estimated value of the propagation delay.

2. The control module of claim 1, wherein the input quantity is an input voltage.

3. The control module of claim 1 further comprising:
a delay-compensation circuit configured to generate the compensation signal based on the input quantity and the estimated value of the propagation delay in the switching cycle; and
a comparator configured to compare the reference and comparison signals and to generate the switching element off signal with the advanced timing based on the input quantity and the estimated value of the propagation delay.

4. The control module of claim 3, wherein the delay-compensation circuit comprises:
a delay estimation circuit configured to generate a delay estimation signal having a parameter correlated to the propagation delay; and
a current source coupled to the delay estimation circuit to receive the delay estimation signal, the current source configured generate the compensation signal based on the delay estimation signal parameter and a control signal that is a function of the input quantity.

5. The control module of claim 4, wherein the current source is configured to generate the compensation signal based on a product of the delay estimation signal parameter and the control signal.

6. The control module of claim 4, wherein the delay estimation circuit comprises a switching circuit configured to be activated in response to the turning-off signal and deactivated in response to the current in the inductive element reaching a threshold.

7. The control module of claim 6, wherein the switching circuit comprises:
an estimation comparator configured to compare an instantaneous value of the current in the inductive element with a delayed value of the current and to generate an output based on this comparison; and
a latch coupled to the output of the estimation comparator and configured to receive the turning-off signal, the latch configured to generate an output having a characteristic indicating the propagation delay.

8. The control module of claim 7, wherein the characteristic of the output of the latch is a pulse width.

9. The control module of claim circuit of claim 1, wherein the inductive element of the switching converter configured to be coupled to the control module comprises a transformer including a primary winding, a secondary winding, and an auxiliary winding, and wherein the control module is configured to detect an auxiliary current in an auxiliary winding that is proportional to the input quantity, and the control module further configured to generate the control signal having a value proportional to the auxiliary current.

10. The control module of claim 1, wherein the control module is configured to control the switching converter having one of a flyback, buck and buck-boost type of topology.

11. A switching power supply, comprising:
switching converter circuitry including an inductive element, a switch, and a sensor element configured to generate a sensing signal based on a current in the inductive element, the switching converter configured to receive an input quantity and having a switching cycle;
a load coupled to the inductive element; and
a control module coupled to the switching converter circuitry, the control module configured to compare a reference signal with a comparison signal that is based on the sensing signal and to generate a switch off signal to turn off the switch, the switch having a propagation delay with respect to the switch off signal and a turning off of the switch, the control module further configured to sense the propagation delay and to estimate a value of the propagation delay each switching cycle of the switching converter, and configured to generate a compensation signal based on the input quantity and the estimated value of the propagation delay in the switching cycle, and further configured to configured to receive the reference signal, the sensing signal, and the compensation signal, and to generate the switching element off signal with an advanced timing based on the input quantity and the estimated value of the propagation delay.

12. The switching power supply of claim 11, wherein the load comprises a plurality of light emitting diodes.

13. The switching power supply of claim 12, wherein the plurality of light emitting diodes comprise a plurality of light emitting diodes coupled in series.

14. The switching power supply of claim 11, wherein the switching converter circuitry comprises one of a buck, buck-boost, and flyback type of switching converter.

15. The switching power supply of claim 11, wherein the input quantity is an input voltage and wherein the switching power supply further comprise a resistive divider coupled to input terminals and the control module, the resistive divider configured to provide to the control module a divided voltage that is proportional to the input voltage.

16. The switching power supply of claim 11, wherein the switch comprises a power transistor.

17. A control method, comprising:
controlling a switching element of switching converter including the switching element and an inductive element coupled to the switching element;
sensing an input quantity supplied to the switching converter;
sensing a current in the inductive element;
generating a comparison signal based on a difference between a reference and the sensed current;
generating a drive control signal to control the switching element;
providing the drive control signal to open the switching element;
detecting switching of the switching element in response to the provided drive control to open the switching element, the switching element having a propagation delay between the drive control signal being provided to open the switching element and an opening of the switching element in response to the provided drive control signal;
sensing the propagation delay each switching cycle of the switching current converter;
generating a compensation signal based on the input quantity and the sensed propagation delay; and
adjusting a timing of the providing of the drive control signal to open the switching element, the timing being based on the input quantity and the sensed propagation delay.

18. The method of claim 17, wherein generating the compensation signal based on the input quantity and the sensed propagation delay comprises generating the compensation signal based on multiplication of the input quantity times the sensed propagation delay.

19. The method of claim 17, wherein adjusting the timing of the providing of the drive control signal to open the switching element comprises advancing the timing of the providing of the drive control signal to the switching element to compensate for the propagation delay of the switching element.

20. The method of claim 17 further comprising sensing a reduction in the current in the inductive element and wherein sensing the propagation delay each switching cycle of the switching current converter comprises generating a delay estimation based upon a time between providing the drive control signal to open the switching element and sensing the reduction in the current in the inductive element.

* * * * *